United States Patent [19]

Cavalcante

[11] 4,247,265
[45] Jan. 27, 1981

[54] CENTRIFUGAL PUMP FOR SMALL THROUGHPUTS, PARTICULARLY FOR WATER CIRCULATION IN AQUARIUMS AND THE LIKE

[75] Inventor: Vittorio Cavalcante, Dueville, Italy

[73] Assignee: Askoll s.r.l., Italy

[21] Appl. No.: 31,855

[22] Filed: Apr. 20, 1979

[30] Foreign Application Priority Data

Jun. 2, 1978 [IT] Italy .............................. 22014/78[U]

[51] Int. Cl.³ .............................................. F04B 35/04
[52] U.S. Cl. .................................................. 417/424
[58] Field of Search ...................... 417/424, 360, 369; 210/169; 310/164

[56] References Cited

U.S. PATENT DOCUMENTS

| | | | |
|---|---|---|---|
| 2,056,936 | 10/1936 | Hayward | 417/360 |
| 2,335,756 | 11/1943 | Haldeman | 210/169 X |
| 3,306,222 | 2/1967 | Simcox | 417/424 X |
| 3,512,646 | 5/1970 | Willinger | 210/169 |
| 3,853,429 | 12/1974 | Wiedenmann | 417/424 X |
| 3,898,488 | 8/1975 | Erwin et al. | 310/164 X |
| 3,940,645 | 2/1976 | Takita | 310/164 X |

FOREIGN PATENT DOCUMENTS

| | | | |
|---|---|---|---|
| 237100 | 1/1962 | Australia | 417/424 |
| 246149 | 7/1963 | Australia | 417/424 |

*Primary Examiner*—Philip R. Coe
*Attorney, Agent, or Firm*—Shlesinger, Fitzsimmons & Shlesinger

[57] ABSTRACT

This invention relates to an electrically operated centrifugal pump of low power absorption for small or very small throughputs. The pump has a pump casing composed of at least two compartments and a cover which encloses an impeller chamber. A first compartment contains a pack of U-shaped laminations having a coil mounted on one arm and pole pieces which partially surround the second compartment. The latter includes a transversely magnetized permanent magnet rotatably supported on a fixed coaxial shaft. The impeller is coupled to one end of the magnet support which projects from said second compartment.

7 Claims, 4 Drawing Figures

CENTRIFUGAL PUMP FOR SMALL THROUGHPUTS, PARTICULARLY FOR WATER CIRCULATION IN AQUARIUMS AND THE LIKE

This invention relates to an electrically operated centrifugal pump of low power absorption for small or very small throughputs, as is used for the slow movement of liquids in containers, and particularly for circulating water in ornamental aquariums and the like.

The object of the invention is to provide a centrifugal pump of the aforesaid type which is particularly simple from the constructional aspect, composed of a minimum number of component parts, easily dismantled and reassembled for cleaning purposes etc., and very reliable in operation even over long periods of continuous operation, without requiring frequent maintenance and without high energy consumption.

The centrifugal pump according to the invention attains the aforesaid objects, and comprises substantially a pump casing which can be fixed to a cover enclosing the chamber in which the impeller acts, the pump casing being composed of at least two compartments hermetically sealed from each other, the first of which contains a pack of U-shaped stator laminations with a coil mounted on one arm and with pole pieces which partly surround the second compartment from the outside, said second compartment, of cylindrical shape, being open towards the end to which the cover enclosing the impeller can be fixed, and containing a transversely magnetised permanent magnet rotatably supported on a fixed coaxial shaft, the impeller being coupled to that end of the support for said magnet which emerges from said second compartment and being arranged to draw in liquid through an aperture in the cover in front of the impeller, and to deliver it to the outside through a side aperture in the cover.

The coupling between the magnet support and impeller is advantageously formed in such a manner as to enable said support to rotate unloaded through a certain angle less than 360°, without the impeller being rotated, in order to make up for the small starting torque that the type of motor used is able to develop.

The pump casing compartment containing the lamination pack and coil can be filled with a resin suitable for using the pump completely immersed in the liquid to be circulated, in which case the coil supply cable, which is suitably retained in the vicinity of its passage into said compartment by a labyrinth seat, is also firmly held and sealed by the filling resin.

In certain applications of the centrifugal pump according to the invention, the compartment containing the magnet, and the cover enclosing the chamber in which the impeller acts, can be constructed separately from the pump casing, which would then comprise only the compartment containing the lamination pack and coil, and said compartment containing the magnet and said cover could be provided in the base of a container to which the pump casing can be fitted, and through which it is required to circulate the liquid.

The centrifugal pump according to the invention is described in greater detail hereinafter with reference to the accompanying drawing in which.

Figure 1:
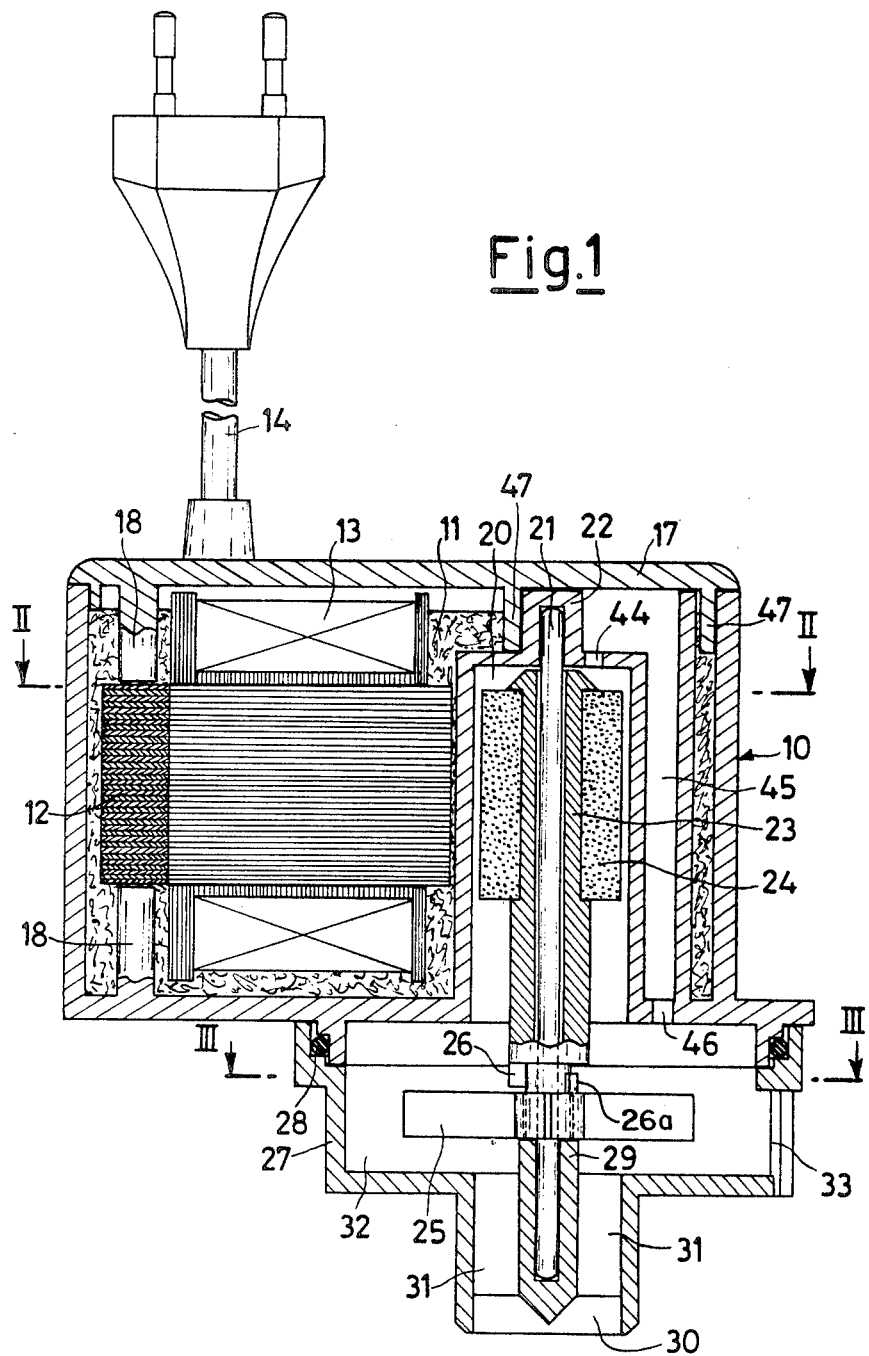
FIG. 1 is a vertical section through the pump, the section being taken through the axis of the impeller, which is disposed at the bottom.
Figure 2:
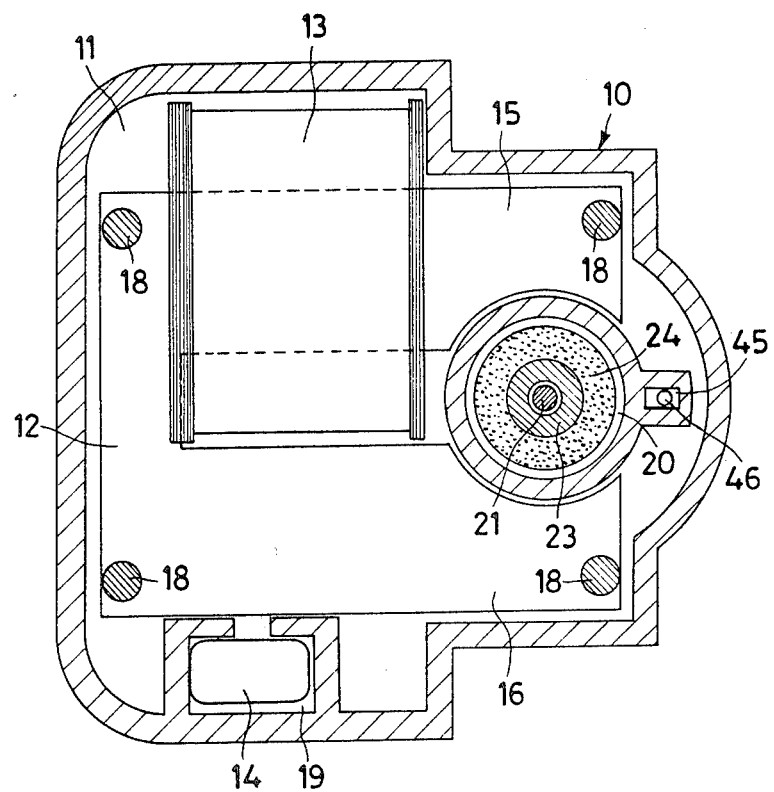
FIG. 2 is a section through FIG. 1 on the line II—II.
Figure 3:
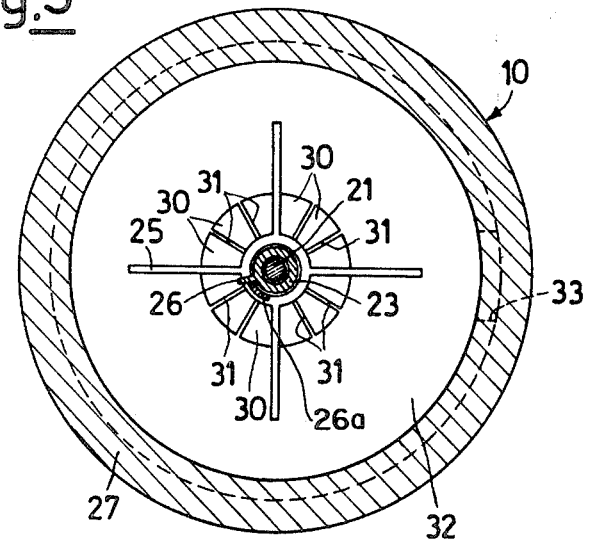
FIG. 3 is a section through FIG. 1 on the line III—III.

As shown in FIGS. 1 to 3, the centrifugal pump according to the invention comprises a pump casing 10 composed of three different compartments separated from each other, namely a compartment 11 containing a pack of U-shaped laminations 12 which carry on one arm a coil 13 which can be supplied by alternating mains current through a supply cable 14. As shown in FIG. 2, the ends of the two arms of the lamination pack 12 are in the form of pole pieces 15 and 16 respectively. The compartment 11 is closed upperly by a cover 17. Suitable ribs 18 projecting towards the inside of the compartment 11 from the casing 10 and from the cover 17 stabilise the position of the lamination pack 12 in the compartment 11. The cable 14 enters the compartment 11 at the top through the cover 17, and is retained in position in this compartment by a labyrinth seat 19. After mounting the lamination pack and the coil with its supply cable in the compartment 11 and closing this compartment with the cover 17, the space in the compartment which remains free can be filled with a suitable resin to enable the pump to be used either completely or partly immersed in the liquid to be circulated. The resin can be poured in either before the compartment 11 is closed by the cover 17, or through a suitable bore (not shown) in this cover.

A second cylindrical compartment 20 open at the other end of the casing 10 to the end closed by the cover 17 penetrates into the compartment 11 at the free space between the pole pieces 15, 16 and is enclosed by a wall forming part of the pump casing 10. A shaft 21 is fixed concentrically in the ompartment 20 and is supported in a support 22 provided in the closed end of the compartment 20. A generally cylindrical member 23 is mounted rotatably on the shaft 21 and supports, fixed to it, a transversely magnetised permanent magnet 24.

On feeding current to the coil 13 an alternating magnetic field is set up which acts on the permanent magnet 24, as in the case of a typical synchronous motor, to rotate it, and consequently rotate the member 23 about the axis of the shaft 21 in the direction of least resistance. In other words, this motor does not have any means for establishing a predetermined direction of rotation.

The shaft 21 and the member 23 rotatable thereon emerge from the compartment 20, and the free end of the member 23 is coupled to an impeller 25, the coupling being formed by an arcuate tooth 26a (FIGS. 1 and 3) formed on the hub of the impeller 25 to project into the path of rotation of a radial lug or a hook 26 that projects from adjacent the end of the member 23. As shown more clearly in FIG. 3, tooth 26a extends only for about 60° about the axis of the impeller 25, and thereby enables the member 23, when energized to rotate clockwise or in the direction of least resistance, and unloaded for about 300° without driving the impeller 25 and without this having to move the liquid, so allowing start-up with a minimum torque (see FIG. 3).

The parts projecting from the compartment 20 are enclosed by a cover 27 which can be suitably fixed to the base of the casing 10 by way of a seal ring 28. Inside the cover 27 there is a support 29 which supports the free end of the shaft 21, the member 23 and the impeller 25 when this latter is in the bottom position as is the case in FIG. 1.

The cover 27 in front of the impeller 25 comprises an intake aperture 30 divided into segments by vertical walls 31 (see FIGS. 1 and 3) for pre-filtering the liquid to be conveyed and for preventing foreign bodies entering the chamber 32 housing the impeller 25.

Finally, the cover 27 comprises an aperture 33 in its side for conveying the liquid out of the chamber 32. A delivery pipe can be connected to the aperture 33 if required, and a suction pipe can likewise be connected to the aperture 30.

The centrifugal pump heretofore described can be even completely immersed in the liquid which is to be circulated. Because of the construction of the pump drive motor, obviously only a fairly small throughput can be obtained.

When the pump as described is operated in a vertical position with its impeller 25 at the bottom (see FIG. 1), it will operate with the compartment 20 full of air as there is no facility at the top for allowing the air to escape, so filling the compartment 20 with liquid.

To obviate this drawback where the pump has to operate in this position, a third compartment 45 is provided in the pump casing 10, extending vertically to the side of the compartment 20.

A bore 44 in the upper wall of the compartment 20 and a bore 46 in the upper wall of the compartment 32 in which the impeller 25 rotates, connect the compartment 45 to the compartment 20 and to the chamber 32 respectively. A rim 47 projecting from the cover 17 towards the inside of the pump casing completely encloses the compartment 45 and the support 22 for the shaft 21, so that the resin filling the compartment 11 cannot penetrate into the compartments 20 or 45.

When the pump is operating in this position, the centrifugal force exerted on the liquid by the impeller 25 and the suction created inside the compartment 20 cause part of the conveyed liquid to pass through the bore 46 into the compartment 45, then rise through it and return into the chamber 32 through the compartment 20, so eliminating any air in the compartment 20. This liquid movement is continuous and both lubricates and cools the rotating parts, and also eliminates the noise which would be generated by the movement of liquid inside a compartment full of air.

This special arrangement is necessary only if the pump is to operate with its impeller at the bottom.

Figure 4:
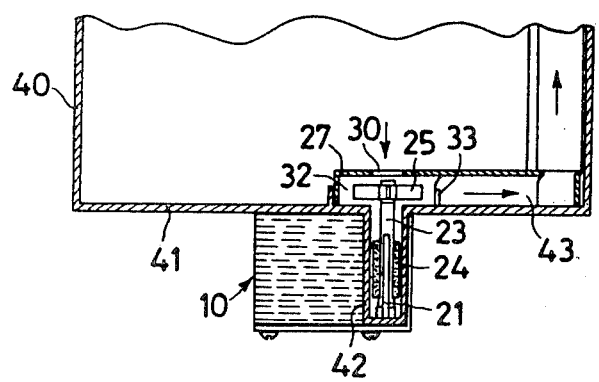
FIG. 4 is a diagrammatic section through one application of the pump according to the invention, with the impeller disposed at the top.

As shown in FIG. 4, the pump according to the invention can also be fitted on to the bottom of a container through which a liquid is to be circulated.

The container, shown in FIG. 4, is indicated by 40 and its base 41 comprises a blank circular projection 42 enclosing a space corresponding to the compartment 20 of FIG. 1. This projection 42 penetrates into the pump casing 10, which is fitted by suitable means to the outside of the base 41 of the container 40. A compartment is provided in the casing 10 to contain the lamination pack, the pole pieces of which partly surround the projection 42, and on an arm of which is mounted the coil. The shaft 21 is mounted in the hollow projection 42 and rotatably supports the member 23 carrying the permanent magnet 24 and the impeller 25, this latter disposed at the top. A cover 27 fitted inside the container 40 on its base 41 encloses the impeller 25, to form the chamber 32, and comprises a suction aperture 30 and a side delivery aperture 33 connected to a delivery conduit 43.

It will be noted that in this case the pump casing 10 comprises only the compartment containing the lamination pack and coil, and the projection 42 defining the compartment 20 penetrates into it. In addition, the shaft 21 in this case is suspended only at its lower end. As the pump casing is external to the liquid to be conveyed, it is possible to dispense with the filling resin for sealing the electrical part.

The advantages of the centrifugal pump according to the invention are apparent from the aforegoing description, these advantages consisting mainly in the extreme constructional simplicity of the pump, its ease of assembly and maintenance, and its reliability during prolonged and continuous operation.

What I claim is:

1. A centrifugal pump for small throughputs, comprising
   a pump casing having fixed to one end thereof a cover, the pump casing being composed of at least two compartments hermetically sealed from each other,
   a pack of U-shaped stator laminations in a first one of said compartments with a coil mounted on one arm thereof and having thereon pole pieces which partly surround a second one of said compartments said second compartment being of cylindrical shape and having an open end facing said cover,
   a shaft fixed in said second compartment coaxially thereof and having a transversely magnetised permanent magnet rotatably supported thereon to be rotated when said coil is energized,
   an impeller mounted to rotate in a chamber in said cover and being coupled to said magnet for rotation thereby, and being arranged to draw in liquid through a first aperture in the cover in front of the impeller, and to deliver it to the outside through a second aperture in the cover.

2. A pump as claimed in claim 1, including means coupling said impeller to the magnet in such a manner as to enable the latter to rotate unloaded through an angle less than 360°.

3. A pump as claimed in claim 1, wherein said shaft projects at one end into said chamber and the cover comprises a support for said one end of the fixed shaft, for the magnet, and for the impeller.

4. A pump as claimed in claim 1, wherein means is provided inside the first compartment for housing one end of a cable for supplying electricity to said coil.

5. A pump as claimed in claim 1, wherein pipes are connected to said first and second apertures of said cover.

6. A pump as claimed in claim 1, wherein the second compartment is defined by part of a container separate from the pump casing, and having a base to which said pump casing is fixed, said part of said casing penetrating into said first compartment from the base of said container.

7. A pump as claimed in claim 1, wherein the pump casing comprises a third compartment extending parallel to the second compartment and being disposed inside the first compartment, said third compartment being connected at its ends to said chamber and to the second compartment, respectively, to allow liquid from the conveyed liquid stream in said chamber to circulate through the second compartment.

* * * * *